United States Patent Office 3,037,269
Patented June 5, 1962

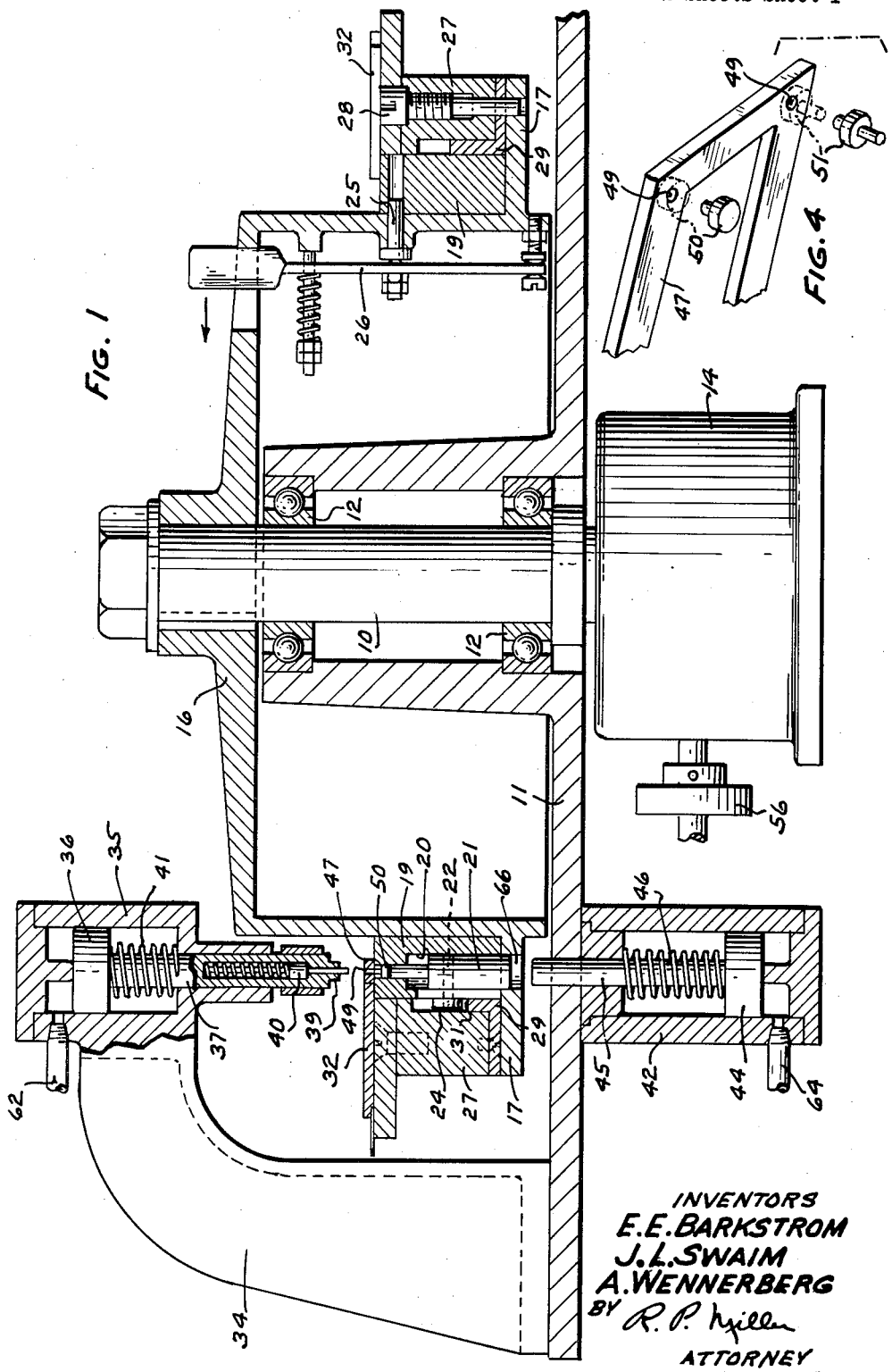

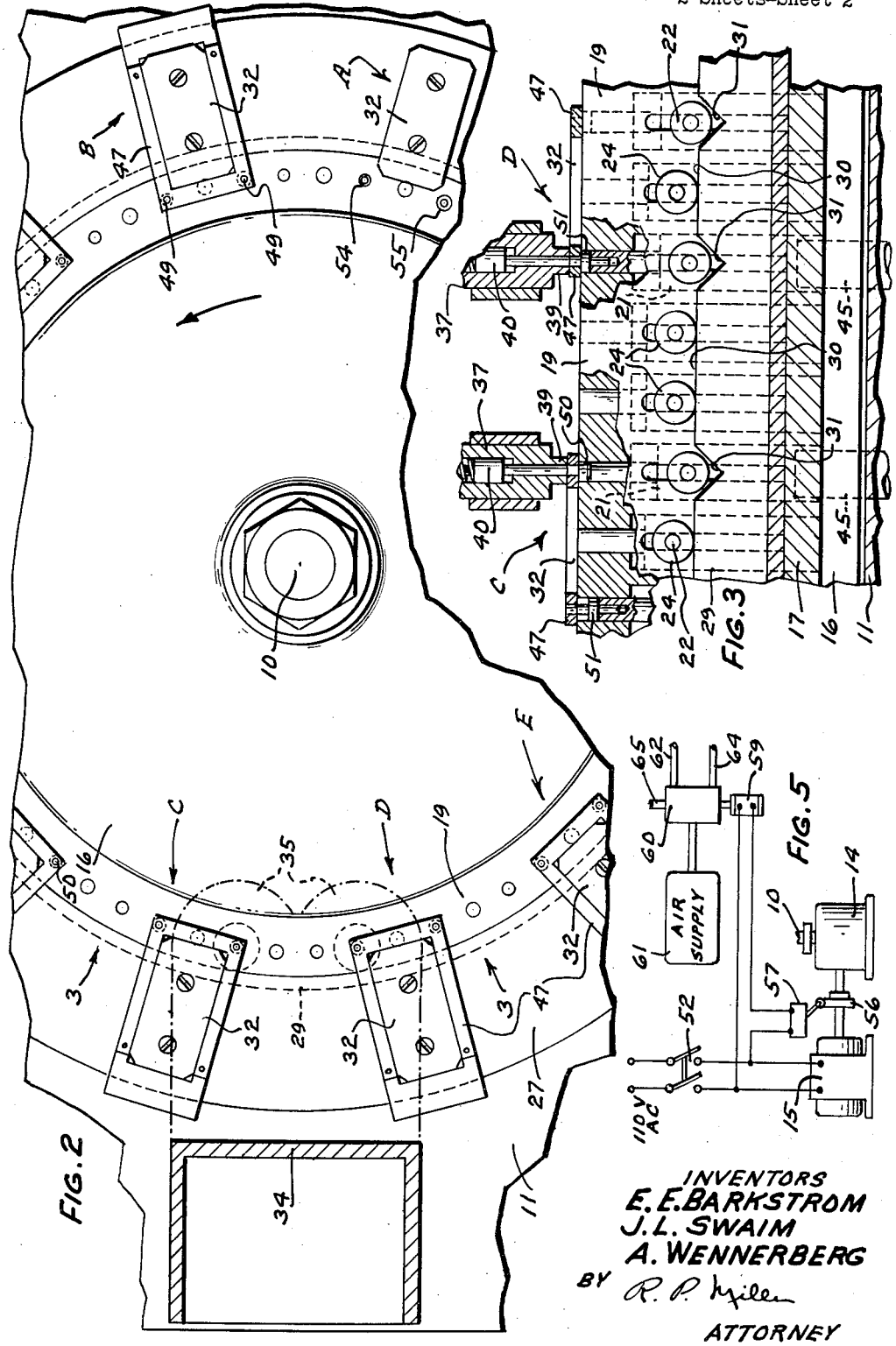

3,037,269
ASSEMBLY APPARATUS
Elmer E. Barkstrom, Chicago, Ill., John L. Swaim, Oklahoma City, Okla., and August Wennerberg, Three Oaks, Mich., assignors to Western Electric Company, Incorporated, New York, N.Y., a corporation of New York
Filed Apr. 22, 1959, Ser. No. 808,241
6 Claims. (Cl. 29—203)

This invention relates to assembly apparatus and more particularly to an apparatus for assembling studs in relay armatures.

It is a primary object of this invention to provide new and useful assembly apparatus.

It is another object of this invention to provide an apparatus for assembling studs in relay armatures.

It is a further object of this invention to provide an indexing work table which will accommodate various combinations of parts to be assembled upon relative movement of parts of the work table without resort to disassembly.

With these and other objects in view, the present invention contemplates an indexing work table formed of a hub and two concentric rings which may each be locked in a plurality of positions relative to the hub. The inner ring mounts stud supporting members and the outer ring mounts work piece or armature guides. By locking the two rings in various positions, different types of stud supports may be positioned adjacent the armature guides to accommodate various types of studs. Air operated plungers are provided above and below the table at one of the indexing positions thereof to push the studs into the armatures while holding the armatures stationary. A drive device is provided to sequentially actuate the plungers and index the table.

Other objects, advantages and novel features of the invention will become apparent upon consideration of the following detailed description in conjunction with the accompanying drawings wherein:

FIG. 1 is a side elevation view, in full section, of an assembly apparatus embodying the principal features of the invention;

FIG. 2 is a fragmentary top view of the apparatus shown in FIG. 1;

FIG. 3 is a sectional view taken along the line 3—3 of FIG. 2 particularly illustrating a plurality of plungers for inserting different types of studs in work pieces, such as armatures;

FIG. 4 is a fragmentary perspective view of a relay armature provided with two of the various types of studs which the present invention will accommodate; and FIG. 5 is a schematic representation of the drive means for the apparatus of the present invention.

Attention is now directed to the drawings wherein like numerals of reference designate like parts throughout the several views and wherein is disclosed the apparatus of the present invention. Referring particularly to FIGS. 1 and 2, there can be seen an index shaft 10 rotatably mounted on a base 11 by means of bearings 12. The lower extremity of the shaft 10 is connected to a suitable indexing mechanism 14 of conventional design which is operated by means of a drive motor 15.

A hub 16 is keyed to the upper extremity of the shaft 10. The hub 16 is provided with a peripheral flange 17 upon which rests an inner ring 19. The ring 19 is provided with a plurality of uniformly-spaced, counterbored apertures 20 within which a plurality of plungers 21 are slidably mounted. Each plunger 21 mounts a transverse pin 22 which carries a cam follower 24. The ring 19 is slidable around the hub 16 and may be locked in position relative to the hub 16 by means of a pin 25 carried by a pivotally-mounted, spring-loaded latch 26.

An outer ring 27 also rests upon the flange 17 and surrounds the inner ring 19. The ring 27 is provided with a locking screw 28 threaded therein which serves to lock the ring 27 in position relative to the flange 17. The ring 27 is also provided with a cam ring 29, of L-shaped cross-section, secured to the bottom thereon and slidably engaging the flange 17. The cam ring 29 is provided with a plurality of camming surfaces 30 (FIG. 3) and notches 31 which are adapted to engage the cam followers 24 to effect movement of the plungers 21. A plurality of work piece or armature guides 32 (FIG. 1) are secured to the top of the outer ring 27 and are so positioned that the inner extremities thereof overlay the inner ring 19. The guides 32 are uniformly spaced about the outer ring 27 and are so positioned as to correspond with the indexing positions of the hub 16 as determined by the structure of the indexing mechanism 14.

A stanchion 34 is secured to the base 11 and serves to support a pair of pneumatic cylinders 35 (only one of which is shown in detail) above the work table formed by the hub 16, the ring 19 and the ring 27 and in axial alignment with certain of the plungers 21 as they are successively indexed beneath the cylinders 35. The cylinders 35 are provided with pistons 36 mounting piston rods 37 which in turn are provided with reduced portions 39 on the lower extremities thereof. A spring-loaded guide pin 40 is mounted within a counterbored aperture formed in the free extremity of each piston rod 37. Compression springs 41 are interposed between the pistons 36 and the bottom of the cylinders 35 to normally urge the pistons and piston rods upwardly.

A second pair of air cylinders 42 (only one of which is shown) is secured to the underside of the base 11 and in axial alignment with the cylinders 35. These cylinders similarly are provided with pistons 44 and piston rods 45 which are adapted to engage the undersides of certain of the plungers 21 to elevate the plungers 21 when actuated. Compression springs 46 are positioned within the cylinders 42 to normally urge the pistons 44 and piston rods 45 downwardly to the position shown in FIG. 1.

Attention now is directed to FIG. 4 of the drawings wherein is disclosed a portion of a relay armature 47 provided with apertures 49 in the corners thereof. The apparatus as disclosed is designed to press the reduced portions of studs 50 and 51 into the apertures 49. Although only two specific types of studs have been shown for purposes of illustration, it is obvious that the apparatus is readily adaptable to the insertion of studs of various other shapes. The studs 50 and 51, when inserted, will occupy the positions shown in dotted lines in FIG. 4.

*Operation*

In order that a better understanding of the invention may be had, its mode of operation will now be described. The power switch 52 (FIG. 5) is closed to start the drive motor 15 which in turn begins to index the hub 16 through the indexing mechanism 14. As the hub 16 indexes, the machine operator places a stud 50 in each aperture marked 54 and a stud 51 in each aperture 55. This may be accomplished at the station designated A. Due to the shape of the cam ring 19, inactive plungers 21 have been elevated, by engagement of their associated cam followers 24 with the surfaces 30 (FIG. 3), to preclude the deposition of studs in any apertures other than those adjacent the corners of the armature guides 32. The operator also places an armature 47 over each of the guides 32 so that the apertures 49 are axially aligned with the studs 50 and 51. This may be accomplished at the station designated B. Continued indexing movements of the hub 16 will position each group of parts to be assembled successively beneath each of the cylinders 35.

A cam 56 is secured to the motor shaft and functions to close the contacts of a switch 57. The cam 56 is so constructed that the contacts of the switch 57 are closed each time the hub 16 has completed an indexing movement. Closure of the contacts of the switch 57 serves to apply power to a solenoid 59 which serves to actuate an air valve 60. Each time the solenoid 59 is actuated, the valve 60 applies air from a suitable air supply 61 to the cylinders 35 and 42 through air lines 62 and 64, respectively. The construction of the valve 60 is such that when the solenoid 59 is deenergized, the air lines 62 and 64 are vented to the atmosphere by a suitable vent 65. The application of compressed air to the lines 62 and 64 causes the pistons 36 and 44 to move downwardly and upwardly, respectively, against the urgings of the compression springs 41 and 46.

As the piston rods 37 descend, the guide pins 40 enter the apertures 49 formed in the armatures 47. Continued downward movement of the piston rods 37 engages the reduced portions 39 thereof with the tops of the armatures 47 and serves to firmly hold the armatures against the top surface of the inner ring 19. Upward movement of the pistons 44 causes the piston rods 45 to engage the under surfaces of the associated plungers 21 to elevate the plungers. The studs 50 and 51 resting on the tops of the plungers 21 are thus elevated to force the reduced portion thereof into the associated apertures 49. The reduced portions of the studs 50 and 51 force the guide pins out of the apertures 49 against the urging of the associated compression springs. At this point, the assembly operation has been completed. When the air lines 62 and 64 are vented to the atmosphere by the valve 60, the compression springs 41 and 46 retract the piston rods 37 and 45 to permit the plungers 21 to drop to their inoperative positions. The cylinders 35 and 42 are so located that the studs 50 are inserted at station C and the studs 51 are inserted at station D to complete each assembly. As each completed assembly moves to station E, it is removed from the apparatus by the operator.

Should it be desired to insert the studs in some permutation other than the one hereinbefore described, the apertures 54 and 55 and associated plungers have been arranged in repeating groups of five around the ring 19, i.e. each indexing station has a similar group of five apertures associated therewith and arranged 55, 55, 54, 55, 54 (counterclockwise in FIG. 2). For example, to insert studs 50 or studs 51 in both apertures in the armature 47, or to insert one of each in a pattern opposite to that shown in FIG. 4, the apparatus may be adjusted to accommodate such assemblies in the following manner. The locking screw 28 is first removed to permit the outer ring 27 to be shifted relative to the flange 17. The ring 27 is then shifted a small amount in either direction to a position where all of the cam followers 24 are in engagement with the cam surfaces 30 on the cam ring 29. The cam ring 29 has been so designed that it is possible to engage all of the cam followers 24 in this manner. With the cam followers 24 all elevated, all the plungers 21 are elevated above apertures 66 which are formed in the flange 17 to accommodate the bottoms of the operative plungers 21 and the piston rods 45.

The pin 25 is next extracted from the ring 19 by moving the latch 26 in the direction indicated by the arrow in FIG. 1. At this point, the rings 19 and 27 are both free to move relative to the hub 16. The two rings are then moved as a unit to position a new combination of apertures 54 and 55 at each of the indexing stations. The latch 26 is then released and the pin 25 enters a new aperture in the ring 19 to again lock the ring 19 in position relative to the hub 16. The outer ring 27 is then moved in a direction opposite to that in which it was first moved to again render certain of the plungers operative. The apparatus is so designed that the plungers rendered operative by this movement will always correspond, in position, to the apertures now designated 54 and 55 in FIG. 2. The locking screw 28 is again inserted to fix the ring 27 in position relative to the flange 17 and the inner ring 19. The apparatus is now ready to be operated in the manner hereinbefore described.

It is obvious that the design embodied in the present invention serves to make one indexing work table do the work of several. With a few simple adjustments, the apparatus can be made to accommodate various combinations of assembly operations. It is, of course, manifest that the principles of the present invention may be utilized in apparatus for performing many operations other than the assembly of parts by press fitting. For example, staking, riveting and reaming operations may also be accomplished in an apparatus such as that disclosed.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Apparatus for assembling studs in apertured workpieces, which comprises a base, a hub rotatably mounted on said base, a workpiece guide secured to said hub for mounting a workpiece having a plurality of stud-receiving apertures in a predetermined position on the hub, a stud-supporting ring mounted movably on said hub concentrically with respect to the axis of rotation thereof, said ring containing a plurality of dissimilar stud-receiving recesses spaced therearound, said ring being shiftable rotatably with respect to the hub whereby various combinations of said recesses may be positioned selectively in alignment with apertures in said workpiece, means for locking said ring in a selected position relative to said hub for rotation therewith, a plurality of plungers slidable axially within said recesses, each of said plungers being movable between a first position to form stud-receiving pockets with the walls of said recesses and a second position to close said recesses to preclude deposition of studs therein, and plunger-actuating means operable, when the ring is shifted rotatably with respect to the hub, to move the plungers of the recesses aligned with apertures in the workpiece to said first position and to move the plungers of the nonaligned recesses to said second position so that only the aligned recesses of a selected combination are open to receive studs therein.

2. Apparatus according to claim 1, wherein the plunger-actuating means is a ring-like cam mounted concentrically of said hub, said cam having an annular camming surface cooperating with the plungers, when the ring is shifted rotatably with respect to the hub, to move the plungers of the recesses aligned with the apertures in the workpiece to said first position and to move the plungers of nonaligned recesses to said second position so that only the aligned recesses of a selected combination are open for receiving the studs therein.

3. Apparatus for assembling studs in apertured workpieces, which comprises a base, a hub rotatably mounted on said base, a first ring movably mounted on said hub concentrically with respect to the axis of rotation thereof, a plurality of dissimilar stud-supporting members spaced around said first ring and axially movable therein, a second ring movably mounted concentrically on said hub, a workpiece guide secured to the upper surface of said second ring for mounting a workpiece having a plurality of stud-receiving apertures in a predetermined position on the second ring in overlapping relationship with said first ring, said rings being shiftable rotatably with respect to each other whereby various combinations of stud-supporting members may be aligned selectively with the apertures in the workpiece, means for locking said first and second rings to said hub for rotation with the hub in a selected position relative to each other, means for moving the aligned stud-supporting members axially relative to said first ring to insert studs carried by the stud-supporting members into the apertured workpiece.

4. Apparatus for assembling studs in apertured workpieces, which comprises a base, a hub rotatably mounted on said base, a first ring movably mounted on said hub concentrically with respect to the axis of rotation thereof, said ring containing a plurality of dissimilar stud-receiving recesses spaced therearound, a second ring movably mounted on said hub concentrically with respect to the axis of rotation thereof, a workpiece guide secured to the upper surface of said second ring for mounting a workpiece having a plurality of stud-receiving apertures in a predetermined position on said second ring in overlapping relationship with said first ring, said rings being shiftable rotatably with respect to each other whereby various combinations of said recesses may be positioned selectively in alignment with apertures in said workpiece for cooperation therewith, means for locking said first and second rings to said hub for rotation with the hub in a selected position relative to each other, a plurality of plungers slidable axially within said recesses, each of said plungers being movable between a first position to form stud-receiving pockets with the walls of said recesses and a second position to close said recesses to preclude deposition of studs therein, a ring-like cam mounted concentrically of said hub, said cam having an annular camming surface cooperating with the plunger when said first and second rings are shifted rotatably with respect to the hub, to move the plungers of the recesses aligned with apertures in the workpiece to said first position and to move the plungers of the nonaligned recesses to said second position so that only the aligned recesses of a selected combination are open for receiving the studs therein, and means for moving the plungers associated with the aligned recesses axially relative to said first ring to insert the studs carried thereby into the apertured workpieces.

5. Apparatus for assembling stud-like articles in a workpiece having a plurality of article-receiving apertures, which comprises a base, a hub mounted rotatably on the base, a ring mounted on the hub concentrically with respect to the axis of rotation of the hub, a plurality of dissimilar support means spaced about the ring for supporting correspondingly dissimilar stud-like articles, means for mounting the workpiece on the hub in overlapping relationship to the ring, the ring and the workpiece-mounting means being mounted to permit selective, relative rotatable movement with respect to each other and to the hub for positioning selectively various combinations of the support means for cooperation with the apertured workpiece, and means for locking the ring and the workpiece-mounting means to the hub for at least one revolution therewith in a selected position relative to each other, whereat a desired combination of the support means is aligned with respective article-receiving apertures in the workpiece, so that a desired combination of stud-like articles is supported in alignment with the respective article-receiving apertures in the workpiece for assembly therein.

6. Apparatus for assembling stud-like articles in a workpiece having a plurality of article-receiving apertures, which comprises a base, a hub mounted rotatably on the base, a first ring mounted on the hub concentrically with respect to the axis of rotation of the hub, the first ring containing a plurality of dissimilar support means spaced about the ring for supporting correspondingly dissimilar stud-like articles, a second ring mounted on the hub concentrically of the first ring, means secured to the second ring for mounting the workpiece in overlapping relationship to the first ring, the rings being mounted to permit selective, relative rotatable movement with respect each to another and to the hub for positioning selectively various combinations of the support means for cooperation with the apertured workpiece, and means for locking the rings to the hub for at least one revolution therewith in a selected position relative to each other, whereat a desired combination of the support means is aligned with respective article-receiving apertures in the workpiece, so that a desired combination of the stud-like articles is supported in alignment with the respective article-receiving apertures in the workpiece for assembly therein.

References Cited in the file of this patent

UNITED STATES PATENTS

| | | |
|---|---|---|
| 821,946 | Marshall | May 29, 1906 |
| 857,005 | Marshall | June 11, 1907 |
| 2,192,106 | Ross | Feb. 27, 1940 |
| 2,507,072 | Weber | May 9, 1950 |
| 2,654,332 | Klausman | Oct. 6, 1953 |
| 2,662,646 | McCain | Dec. 15, 1953 |
| 2,670,705 | Herrold | Mar. 2, 1954 |
| 2,683,924 | Schryver | July 20, 1954 |